UNITED STATES PATENT OFFICE.

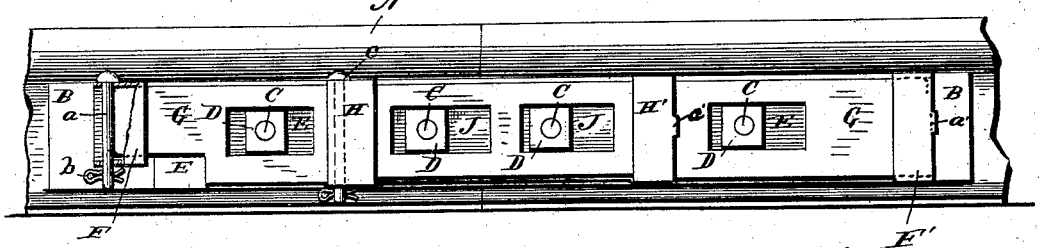

WILLIAM A. PRESTON, OF FORT BRANCH, INDIANA.

NUT-LOCK.

SPECIFICATION forming part of Letters Patent No. 407,686, dated July 23, 1889.

Application filed February 28, 1889. Serial No. 301,477. (No model.)

*To all whom it may concern:*

Be it known that I, WILLIAM A. PRESTON, a citizen of the United States, residing at Fort Branch, in the county of Gibson and State of Indiana, have invented certain new and useful Improvements in Nut-Locks, of which the following is a specification, reference being had therein to the accompanying drawings, in which—

Figure 1 represents a side elevation of the adjacent ends of two railroad-rails connected together in the usual manner with fish-plates and bolts and nuts, the nuts being effectually prevented from unscrewing or loosening by my improved devices; Fig. 2, a transverse sectional view taken on the line $x\ x$ of Fig. 5; Fig. 3, a detail perspective view of one end of the main or inner bar; Fig. 4, a similar view of a portion of the inner bar; Fig. 5, a horizontal sectional view of Fig. 1; Fig. 6, a detail perspective view of the main bar; Fig. 7, a similar view of the main locking-bar; Fig. 8, a similar view of the interposed plate; and Fig. 9, a similar view of the supplemental locking-bar.

The invention has for its object the provision of means for effectually locking the nuts employed in rail-joints, whereby the constant jar and vibration caused by the rolling-stock passing over the rails will be prevented from unscrewing the nuts, as will more fully hereinafter appear.

The invention consists in certain novel features of construction and arrangement of parts that will be fully hereinafter described, and pointed out in the claim appended.

Referring to the annexed drawings, the letter A designates the rails; B B, the connecting fish-plates; C, the connecting-bolts, and D the nuts on the bolts, these parts all being arranged and constructed in the usual and well-known manner. Between the nuts D and the adjacent fish-plate is clamped a bar E, this bar being provided with holes for the passage of the bolts. This bar E is provided at its ends with box-loops F F', the former being provided with holes for the passage of a vertical confining-pin $a$, and the latter with a stop $a'$, for the purpose hereinafter described. The confining-pin is held in place and prevented from being accidently displaced by means of a small split pin $b$, passed through an aperture in its lower end. Confined to the face of the inner bar E by means of the loops F is the main locking-bar G, provided with four longitudinal slots for the reception of the main nuts D, these slots being approximately the same width as the nuts to prevent the same turning while the bar is in place. The ends of the locking-bar set in the loops F, and the bar is held therein by means of the confining-pin $a$, the stop $a'$ preventing the bar moving in the other direction. When this main locking-bar is thus secured removably in place, it is evident that the nuts will be prevented from unscrewing or loosening prematurely. When it is desired to remove the locking-bar, it is simply necessary to withdraw the confining-pin $a$, and then slide the bar to the left a sufficient distance to free its other end from the box-loop F', the slots in the bar being long enough to permit this to be done. As will be observed, the left-hand ends of the inner bar and main locking-bar are reduced, in order that the confining-pin $a$ will not interfere with the base of the rail.

The main locking-bar is provided with loops H H', similar in construction to the above-mentioned loops F F'—that is to say, the former is provided with holes for the passage of the confining-pin $c$, and the latter with a stop $c'$, as shown. These loops are, in a similar manner to the loops F F', adapted to hold in place a shorter supplemental locking-bar I, which is also provided with longitudinal slots, which embrace two supplemental nuts D' D', screwed upon the two middle bolts C and prevent the latter unscrewing. This supplemental locking-bar is removed in the same manner as the main locking-bar. Clamped between the adjacent faces of the two locking-bars and between the main and supplemental nuts D' D' is a flat metallic plate J, which is provided with holes for the passage of the two middle bolts C C. This supplemental bar and metallic plate serve to prevent the main locking-bar from springing or bulging outward.

Having thus fully described my invention, what I claim, and desire to secure by Letters Patent, is—

The combination of the rails, the fish-plates, the connecting-bolts provided with nuts D, a bar E, clamped to the face of one of the fish-plates and provided with loops F F', the latter loop carrying a stop $a'$ and the former a removable pin $a$, a main locking-bar G, held removably against the face of the said bar E by means of the loops F F', and provided with loops H H' and longitudinal slots for the reception of the nuts D, the said loops H H' being provided, respectively, with a removable pin and a stop, a plate J, placed against the face of the bar G between the loops H H', nuts D', for clamping this plate against the face of bar G, a supplemental bar I, held removably against the plate J by the loops H H' and provided with slots for the reception of the nuts D', as and for the purpose set forth.

In testimony whereof I affix my signature in presence of two witnesses.

WILLIAM A. PRESTON.

Witnesses:
WALTER E. BELL,
JOHN JONES.